US009041733B2

(12) United States Patent
Griffin

(10) Patent No.: US 9,041,733 B2
(45) Date of Patent: May 26, 2015

(54) METHODS FOR ADJUSTING A PRESENTATION OF GRAPHICAL DATA DISPLAYED ON A GRAPHICAL USER INTERFACE

(75) Inventor: Jason Tyler Griffin, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 535 days.

(21) Appl. No.: 13/100,414

(22) Filed: May 4, 2011

(65) Prior Publication Data

US 2012/0281015 A1  Nov. 8, 2012

(51) Int. Cl.
*G09G 5/377* (2006.01)
*G06F 1/16* (2006.01)

(52) U.S. Cl.
CPC .............. *G09G 5/377* (2013.01); *G06F 1/1626* (2013.01); *G06F 1/1694* (2013.01); *G09G 2320/0261* (2013.01); *G09G 2340/12* (2013.01); *G06F 2200/1637* (2013.01)

(58) Field of Classification Search
CPC ................ G09G 5/14; G09G 2340/10; G09G 2340/125; G06T 11/60; G06T 15/503
USPC ......................................................... 345/629
See application file for complete search history.

(56) References Cited

U.S. PATENT DOCUMENTS

| 6,466,198 | B1 | 10/2002 | Feinstein |
| 6,834,249 | B2 * | 12/2004 | Orchard .................. 702/141 |
| 6,933,923 | B2 | 8/2005 | Feinstein |
| 6,977,675 | B2 | 12/2005 | Kotzin |
| 7,184,025 | B2 | 2/2007 | Williams et al. |
| 7,271,795 | B2 | 9/2007 | Bradski |
| 2003/0001863 | A1 * | 1/2003 | Davidson et al. ............. 345/619 |
| 2007/0103454 | A1 | 5/2007 | Elias |
| 2007/0176898 | A1 | 8/2007 | Suh |
| 2008/0030360 | A1 * | 2/2008 | Griffin ......................... 340/689 |
| 2008/0034321 | A1 | 2/2008 | Griffin |
| 2008/0259094 | A1 | 10/2008 | Kim et al. |
| 2009/0265627 | A1 | 10/2009 | Kim et al. |
| 2009/0289958 | A1 | 11/2009 | Kim et al. |
| 2010/0004031 | A1 * | 1/2010 | Kim .............................. 455/566 |
| 2010/0030469 | A1 | 2/2010 | Hwang et al. |
| 2010/0103102 | A1 | 4/2010 | Shih et al. |

(Continued)

FOREIGN PATENT DOCUMENTS

CN  101626427  1/2010
EP  1 667 471  6/2006

(Continued)

OTHER PUBLICATIONS

Extended European Search Report in European Patent Application No. EP 11 164 752.5, mailed on Sep. 27, 2011 (7 pages).

(Continued)

*Primary Examiner* — Mark Zimmerman
*Assistant Examiner* — Michelle Chin
(74) *Attorney, Agent, or Firm* — Fish & Richardson P.C.

(57) ABSTRACT

Methods and systems for adjusting graphical data displayed on a graphical user interface (GUI) of an electronic device are disclosed. The method may include monitoring movement of the electronic device and identifying a predetermined movement of the electronic device. The method may further include overlaying new graphical data to existing graphical data displayed on the GUI in response to the predetermined movement.

20 Claims, 9 Drawing Sheets

(56) References Cited

U.S. PATENT DOCUMENTS

| | | | |
|---|---|---|---|
| 2010/0138766 A1 | 6/2010 | Nakajima | |
| 2010/0141784 A1* | 6/2010 | Yoo | 348/222.1 |
| 2010/0149094 A1* | 6/2010 | Barnes et al. | 345/156 |
| 2010/0188503 A1 | 7/2010 | Tsai et al. | |
| 2010/0214211 A1* | 8/2010 | Dods et al. | 345/156 |
| 2011/0115817 A1* | 5/2011 | Chun | 345/629 |
| 2012/0062593 A1* | 3/2012 | Kojima | 345/629 |
| 2012/0069052 A1* | 3/2012 | Lee et al. | 345/633 |
| 2012/0075336 A1* | 3/2012 | Oda | 345/629 |

FOREIGN PATENT DOCUMENTS

| | | |
|---|---|---|
| EP | 2 144 425 | 1/2010 |
| JP | 2002-62964 | 2/2002 |

OTHER PUBLICATIONS

International Search Report in PCT/CA2011/050270, mailed on Jan. 31, 2012 (3 pages).

Written Opinion in PCT/CA2011/050270, mailed on Jan. 31, 2012 (5 pages).

Office Action issued by German Patent Office, in German Patent Application No. 11 2011 100 058.8, dated Jun. 5, 2014.

Office Action issued in CN Application No. 201180003756.6, dated Dec. 17, 2014, 9 pages.

* cited by examiner

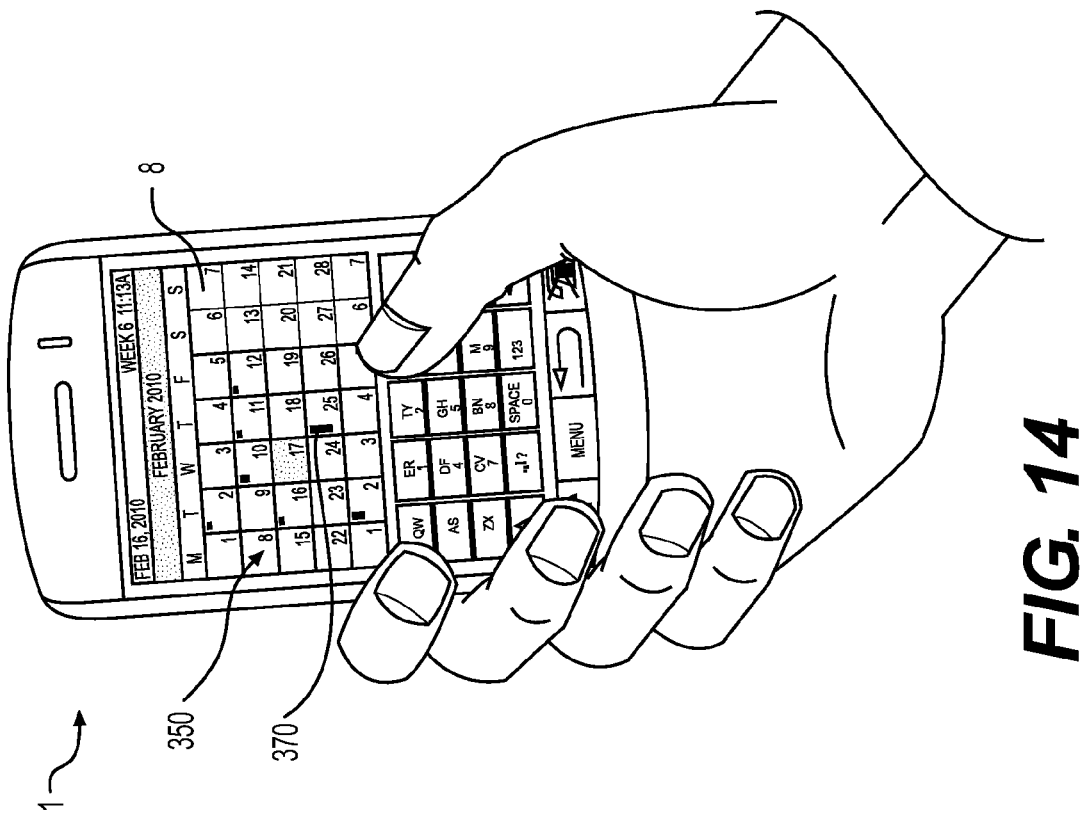

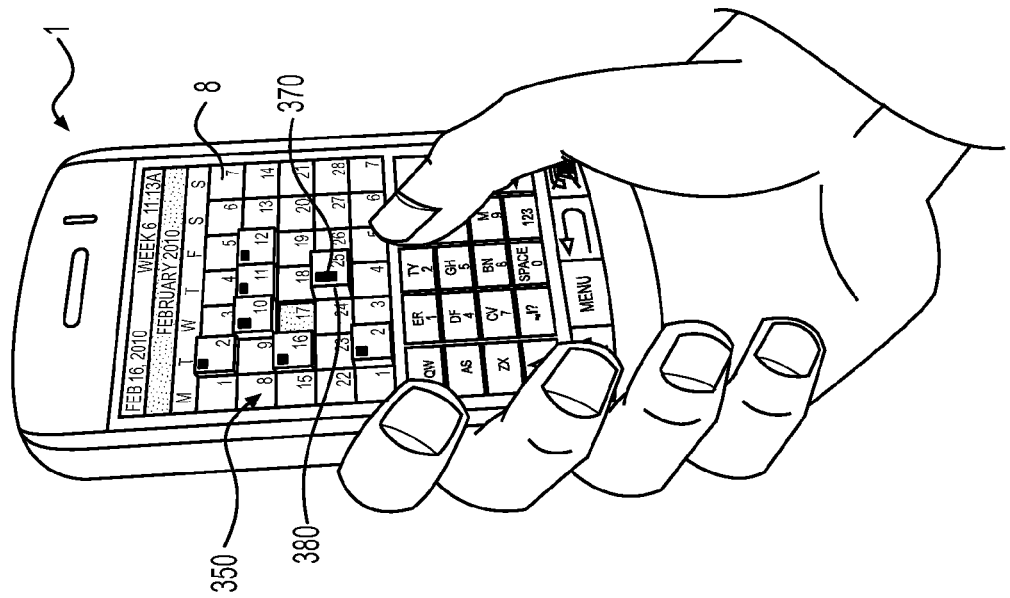
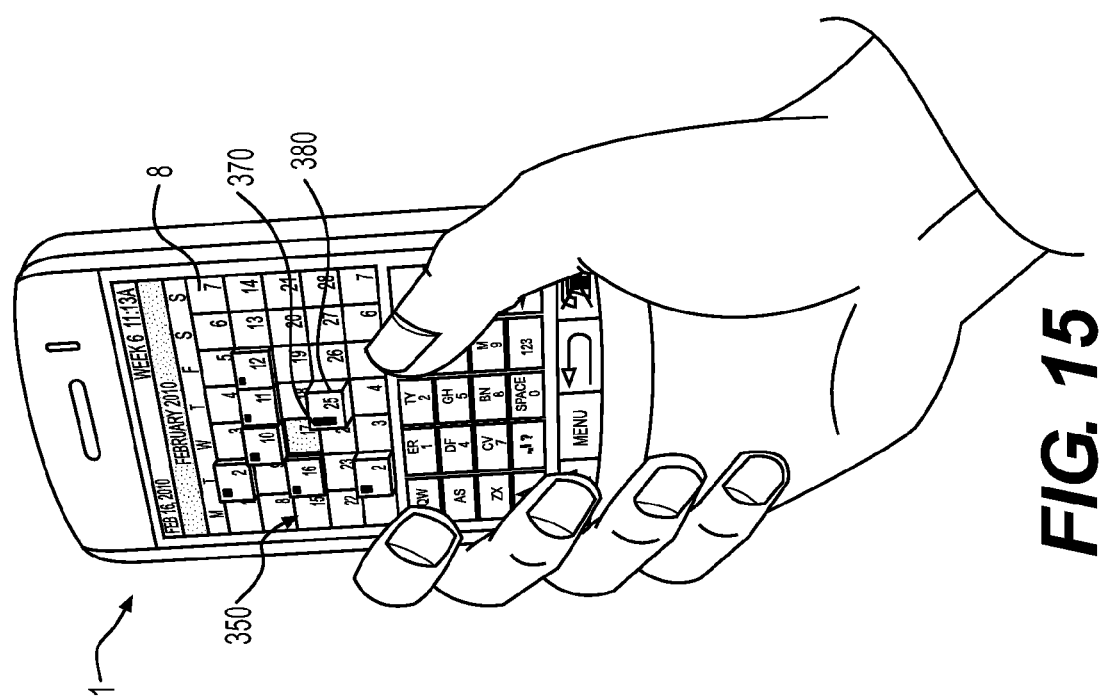

METHODS FOR ADJUSTING A PRESENTATION OF GRAPHICAL DATA DISPLAYED ON A GRAPHICAL USER INTERFACE

FIELD OF TECHNOLOGY

The present disclosure relates to adjusting graphical data displayed on graphical user interfaces of portable electronic devices and, more specifically, to overlaying new graphical data to existing graphical data in response to a predetermined movement of such devices.

BACKGROUND

Electronic devices, including portable electronic devices, have gained widespread use and may provide a variety of functions including, for example, telephonic, electronic messaging, and other personal information manager application functions. Portable electronic devices include, for example, mobile stations, cellular telephones, smart telephones, wireless personal digital assistants, and laptop computers with wireless capabilities.

Such devices include displays and operating systems providing graphical user interfaces (GUIs) that impart, among other things, graphical data about applications and services provided by the device to the user. The displayed graphical data may be modified depending on the functions and operations being performed. In certain instances, a user may highlight, add, or remove graphical data displayed on the GUIs by, for example, inputting commands and functions via a keypad or the like.

For certain applications, it may be cumbersome and/or undesirable for a user to access the keypad to control and modify the graphical data displayed on the GUI. Accordingly, a need exists to simplify the manner in which graphical data displayed on the GUI may be modified.

BRIEF DESCRIPTION OF THE DRAWINGS

It is to be understood that following detailed description is examplary and explanatory only and is not restrictive of the concepts disclosed herein, as claimed. The accompanying drawings, which are incorporated in and constitute a part of this specification, illustrate several embodiments together with the description. In the drawings:

FIGS. 14 to 16 illustrate another example adjustment of graphical data displayed on a display of a portable electronic device, consistent with disclosed embodiments.

DETAILED DESCRIPTION

Figure 1:
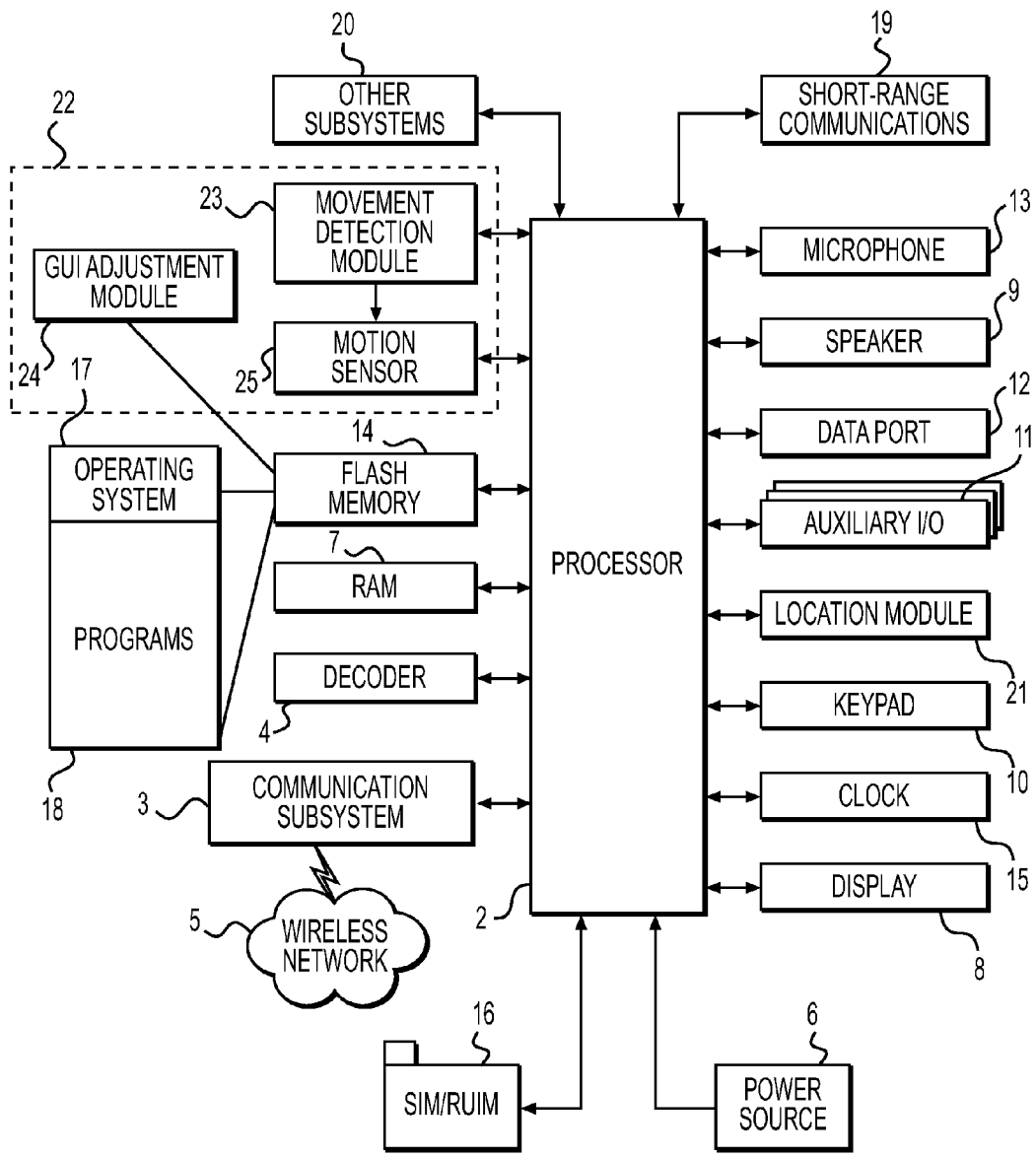
FIG. 1 is a block diagram of a portable electronic device, consistent with disclosed embodiments.

Reference will now be made in detail to the example embodiments, which are illustrated in the accompanying drawings. For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the example embodiments described. The description is not to be considered as limited to the scope of the example embodiments described herein.

The disclosure generally relates to a portable electronic device. Examples of portable electronic devices include mobile, or handheld, wireless communication devices such as pagers, cellular phones, cellular smart-phones, wireless organizers, personal digital assistants, tablets, and wirelessly enabled notebook computers. The portable electronic device may also be a portable electronic device without wireless communication capabilities, such as a handheld electronic game device, digital photograph album, digital camera, or other portable device.

FIG. 1 illustrates a block diagram of an example of a portable electronic device 1. Portable electronic device 1 includes multiple components, such as a processor 2 configured to control the overall operation of the portable electronic device 1. In one embodiment, processor 2 comprises a microprocessor. Communication functions, including data and voice communications, are performed through communication subsystem 3. In one embodiment, device 1 is configured to receive compressed data and to decompress and decrypt the data by using a decoder 4. Communication subsystem 3 receives messages from and send messages to a wireless network 5. Wireless network 5 may be any type of wireless network, including, but not limited to, data wireless networks, voice wireless networks, and networks that support both voice and data communications. Power source 6, such as one or more rechargeable batteries or a port to an external power supply, powers portable electronic device 1.

In addition, processor 2 interacts with other components of portable electronic device 1, such as a random access memory (RAM) 7, a display 8, a speaker 9, a keypad 10, auxiliary I/O devices 11, a data port 12, a microphone 13, a flash memory 14, and a clock 15.

To identify a subscriber for network access, portable electronic device 1 uses a Subscriber Identity Module or a Removable User Identity Module (SIM/RUIM) card 16 for communication with a network, such as wireless network 5. Alternatively, user identification information may be programmed into flash memory 14.

Portable electronic device 1 includes an operating system 17 and software programs or applications 18 that are executed by processor 2 and may be stored in a persistent, updatable store such as flash memory 14. Additional applications or programs may be loaded onto portable electronic device 1 through wireless network 5, auxiliary I/O subsystem 11, data port 12, short-range communications subsystem 19, or any other suitable subsystem 20.

A received signal such as a text message, an e-mail message, or web page download is processed by communication subsystem 3 and input to processor 2. Processor 2 processes the received signal for output to display 8 and/or to auxiliary I/O subsystem 11. A user may generate data items, for example e-mail or text messages, which may be transmitted over wireless network 5 through communication subsystem 3. For voice communications, the overall operation of the portable electronic device 1 may be similar. Speaker 9 outputs audible information converted from electrical signals, and microphone 13 converts audible information into electrical signals for processing.

Electronic device 1 also includes a location module 21. Location module 21 may include, for example, a GPS module, and may be configured to receive and interpret GPS signals from a system of satellites to triangulate the current location of device 1.

Electronic device 1 also includes a graphics system 22 configured to manage graphical data displayed on display 8. In one embodiment, graphics system 22 includes a movement detection module 23 and a GUI adjustment module 24.

Movement detection module 23 is configured to detect movement of electronic device 1 and input movement data to processor 2. In one embodiment, movement detection module 23 includes a motion sensor 25 configured to generate a signal responsive to a change in orientation of electronic device 1. In this embodiment, motion sensor 25 includes a low-g micro-electromechanical system (MEMS) accelerometer. The accelerometer may be any type, including a capacitive, piezoelectric, piezoresistive, or a gas-based accelerometer. The accelerometer senses and converts an acceleration detected from a motion or a movement of electronic device 1 (e.g., tilt, rotation, inertial, or vibration) or gravity into an electrical signal and may be available in one, two, or three axis configurations. The accelerometer produces digital or analog output signals. In other example embodiments, motion sensor 25 includes a tilt, motion or orientation sensor, such as a gyroscope.

GUI adjustment module 24 is configured to receive movement data determined by movement detection module 23 and associate new graphical data to existing graphical data displayed on display 8 based on the movement data. For instance, GUI adjustment module 24 is configured to overlay new graphical data to existing graphical data. Graphical data includes, for example, text, icons, graphics, dialog boxes, and any other visual information for a user. Graphical data, and information relating to, for example, the current view, placement, location, and orientation of the graphical data, is stored in flash memory 14 and accessed and modified by GUI adjustment module 24.

Figure 2:
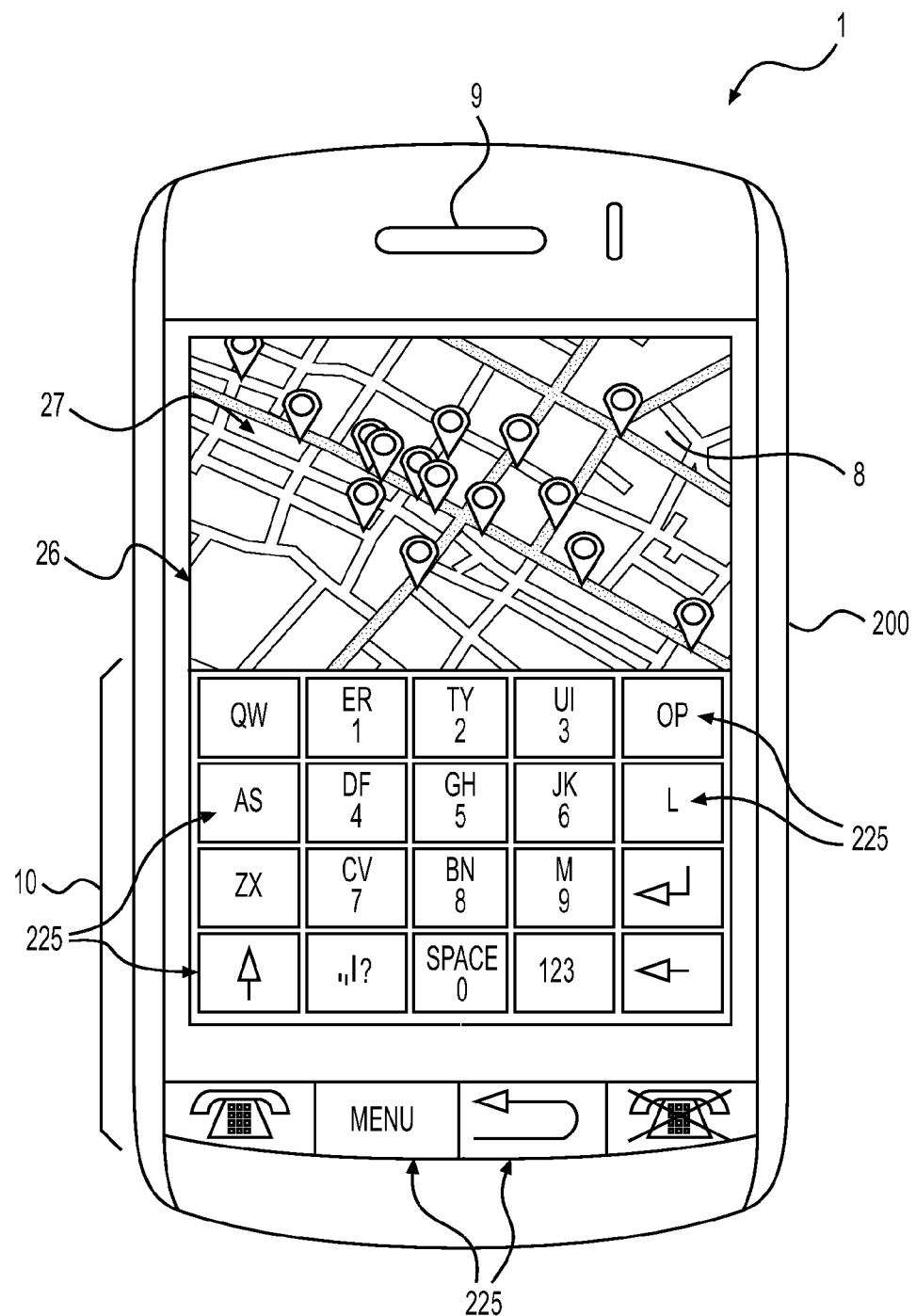
FIG. 2 is a top plan view of a portable electronic device, consistent with disclosed embodiments.

A top plan view of portable electronic device 1 is shown generally in FIG. 2. The example portable electronic device 1 illustrated in FIG. 2 includes a housing 200 in which may be disposed various components such as those shown in FIG. 1. For example, various input apparatuses and output apparatuses, processor 2, and flash memory 14 for storing at least programs and/or applications 18 are disposed in housing 200. Processor 2 is responsive to input signals from input apparatus, such as keypad 10, and provides output signals to output apparatus, such as display 8 or speaker 9. Processor 2 also interfaces with flash memory 14 and is capable of executing programs 18.

A screen image 26 is generated on display 8 and comprises graphical data related to one or more applications and/or programs stored in flash memory 14. For example, applications and/or programs may generate and control graphical data on screen image 26. In the example embodiment of FIG. 2, screen image 26 includes graphical data related to a map application 27. Map application 27 provides a graphical interface to allow a user to determine the user's location and to navigate around a geographic region near the user's location. Graphical data pertaining to map application 27 includes, for example, images depicting streets, points of interest, and text identifying street names and destinations. Accordingly, the GUI is comprised of the graphical data and user-operated functions related to a program or an application presented on display 8.

As can be understood from FIG. 2, the output apparatus includes display 8 and speaker 9, each of which is responsive to one or more output signals from processor 2. The input apparatus includes keypad 10. Keypad 10 includes input members 225, such as mechanical keys using, for example, a mechanical dome switch actuator. Alternatively, input members 225 on keypad 10 may be part of display 8, with display having a touch-sensitive configuration as is known in the art. In certain example embodiments, input members 225 form a QWERTY keyboard, either in reduced or full format. In a reduced keyboard, a number of input members 225 are assigned to two or more characters. In other example embodiments, input members 225 are assigned characters alphabetically.

Although not shown in FIG. 2, it should be appreciated that some embodiments of handheld electronic device 1 include other input apparatuses, such as a scroll wheel, an optical trackpad, or a ball located either on the face or side of device 1. These input apparatuses provide additional inputs to processor 2. For example, a scroll wheel provides one input to processor 2 when rotated and a second input to processor 2 when actuated. An optical trackpad provides one input to processor 2 when swiped and a second input to processor 2 when pressed or tapped.

Figure 3:
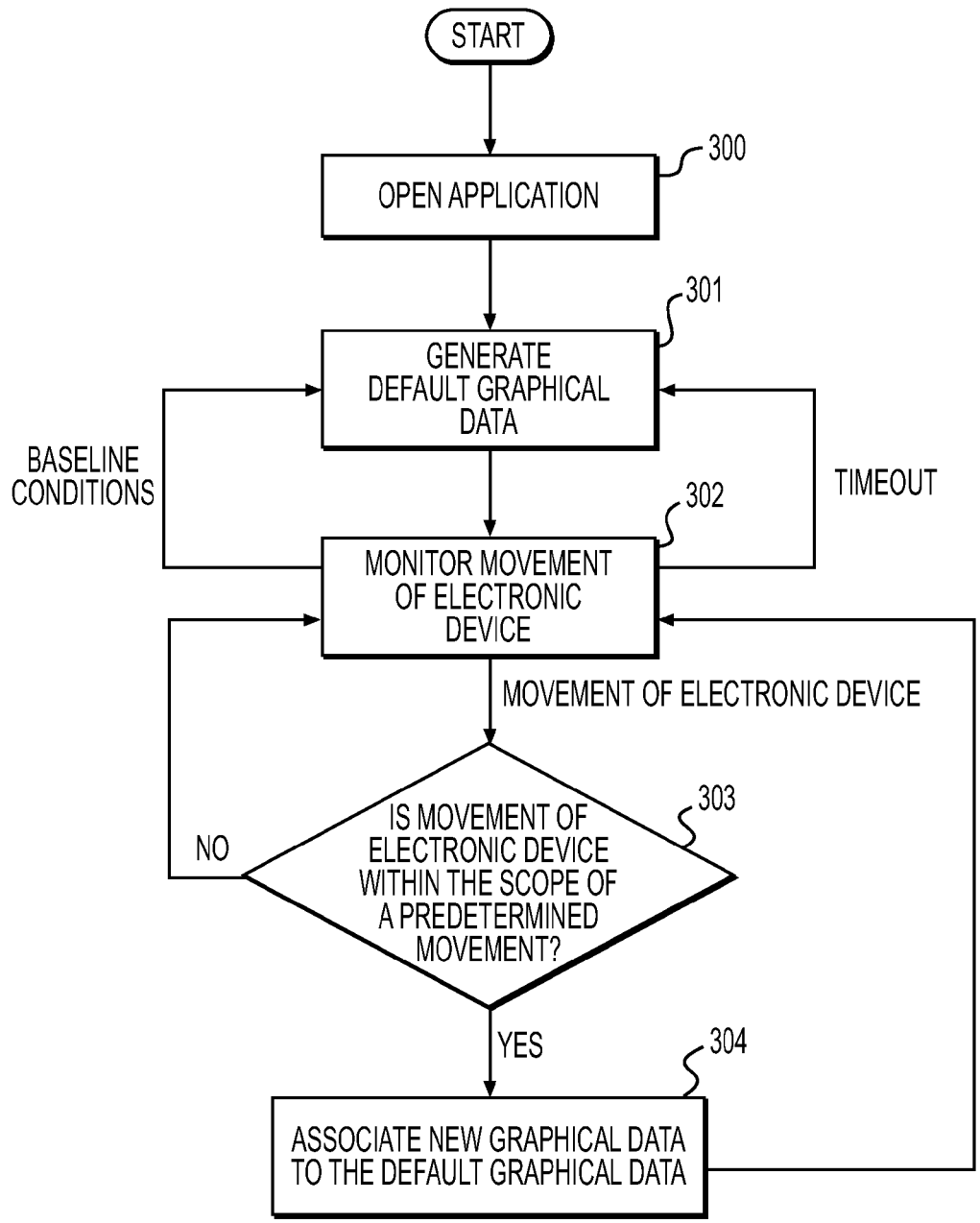
FIG. 3 is a flow diagram of an example process for adjusting a presentation of graphical data displayed on a display of a portable electronic device, consistent with disclosed embodiments.

FIG. 3 illustrates a flow diagram of an example process for adjusting a presentation of graphical data displayed on display 8 of electronic device 1. In one embodiment, the process is carried out by software stored as part of programs 18, and executed by processor 2.

At step 300, a user opens an application or program, such as map application 27 discussed above, and processor 2 then generates default graphical data related to the user selected application (e.g., map application 27) on display 8 (step 301). The default graphical data includes an initial set of images, graphics, and/or text associated with the user selected application. The default graphical data is generated and positioned on display 8 under baseline conditions of electronic device 1, such as when electronic device 1 is motionless or lying flat relative to the user.

At step 302, graphics system 22 monitors movements of electronic device 1. That is, movement detection module 23 detects movements (e.g., shifts, tilts, rotations, vibrations, and the like) of electronic device 1 and delivers movement data corresponding to a detected movement to processor 2. Processor 2 stores the movement data in flash memory 14, and GUI adjustment module 24 receives the movement data from flash memory 14. If a movement has been detected, the movement data is obtained by GUI adjustment module 24 and analyzed to determined whether the detected movement is within the scope of a predetermined movement, step 303.

The predetermined movement is a threshold motion or movement, which initiates GUI adjustment module 24 to adjust the default graphical data presented on display 8. For example, the predetermined movement has particular motion characteristics, such as direction, orientation, and acceleration, stored in flash memory 14. If GUI adjustment module 24 obtains movement data at least substantially similar to the stored motion characteristics, GUI adjustment module 24 proceeds to adjust the default graphical data. In one example embodiment, rotation of electronic device 1 to the left or to the right relative to the user at a preset acceleration constitutes a predetermined movement appropriate for initializing graphical adjustment by GUI adjustment module 24. Additionally, or alternatively, tilting electronic device 1 forwards or backwards at a preset acceleration may be the predetermined movement. In other words, predetermined movement is any other motion or movement, such as shifting or shaking electronic device 1 up or down and/or left or right.

If movement of electronic device 1 is not within the scope of the predetermined movement, graphics system 22 continues to monitor movements of electronic device 1, step 302. If movement of electronic device is within the scope of the predetermined movement, GUI adjustment module 24 then associates new graphical data to the default graphical data presented on display 8 (step 304).

At step 304, GUI adjustment module 24 overlays new graphical data on top of the default graphical data already existing on display 8. For instance, in response to the movement of electronic device 1, GUI adjustment module 24 adds new images, text, dialog boxes, and/or graphics to the existing default images and graphics on display 8. The new graphical data presents additional information to the user pertaining to the user selected application. Furthermore, in some example embodiments, display 8 does not display new graphical data prior to the movement of electronic device 1. The new images, text, and/or graphics are positioned directly on top of the existing images and graphics to highlight information previously presented by the default graphical data. Moreover, the new images, text, and/or graphics are positioned adjacent, proximate, or separate from the existing graphical data on display 8. In one embodiment, the new graphical data covers or masks at least some of the existing graphical data presented on display 8. Additionally, or alternatively, the new graphical data is positioned directly on top of the existing graphical data and displayed in a transparent mode to expose the existing graphical data. Such an arrangement allows the user to distinguish between the new and existing graphical data yet still identify both sets of graphical data.

GUI adjustment module 24 also removes at least some of the default graphical data existing on display 8. For example, in response to an appropriate movement (e.g., movement within the scope of the predetermined movement) of electronic device 1, GUI adjustment module 24 hides or eliminates existing images, graphics, and/or text from display 8. By removing certain graphical data, display 8 presents only a predetermined selection of graphical data, which may provide graphical clarity and organization to the user. In other words, GUI adjustment module 24 highlights graphical data to the user by displaying only certain images, text, and/or graphics. It should also be appreciated that GUI adjustment module 24 provides a smooth transition when overlaying new graphical data or removing existing graphical data.

When overlaying new graphical data or removing certain existing graphical data, GUI adjustment module 24 maintains a position and an orientation of the existing graphical data remaining on display 8. In other words, certain existing images, graphics, and/or text retain a spatial arrangement on display 8. For example, the existing images, graphics, and/or text are notionally positioned relative to each other using x, y, and z Cartesian coordinates on display 8. GUI adjustment module 24 fixes the existing images, graphics, and/or text at their corresponding x, y, and z coordinates when new images, graphics, and/or text is added or when certain existing graphical data is removed. That is, the position of the existing graphical data does not move when new graphical data is added to display 8 and when some graphical data is eliminated from display 8.

Graphics system 22 continues to monitor movements of electronic device 1 (step 302), and overlays new graphical data to the default graphical data when appropriate. In one embodiment, GUI adjustment module 24 regenerates the default graphical data on display 8 (step 301), if movement data obtained by module 24 is indicative of baseline conditions (e.g., the initial position and configuration of device prior to the predetermined movement). That is, any new graphical data is removed, and any removed default graphical data is restored, when electronic device 1 is moved and returned to the initial, default position, as indicated by the arrow labeled "baseline conditions." Additionally, GUI adjustment module 24 regenerates the default graphical data if electronic device 1 is not moved for a set period of time, as indicated by the arrow labeled "timeout." For example, when electronic device 1 moves to a new position from a baseline position, new graphical data is added to the default graphical data on display 8. If electronic device 1 remains at rest (or is not moved) at the new position for a set period of time, the new graphical data is gradually removed from display 8, and display 8 presents the default graphical data as initially displayed during baseline conditions. Moreover, if certain default graphical data was removed from display 8 in the new position, the removed, previously presented graphical data is regenerated onto display 8 if electronic device 1 is maintained at the new position for the set period of time. The set period of time is stored in flash memory 14, and processor 2 monitors the time at which electronic device 1 is in the new position via, for example, clock 15 and stores time data in flash memory 14. GUI adjustment module 24 obtains the time data and regenerates the default graphical data based on the aforementioned "timeout" conditions.

Figure 5:
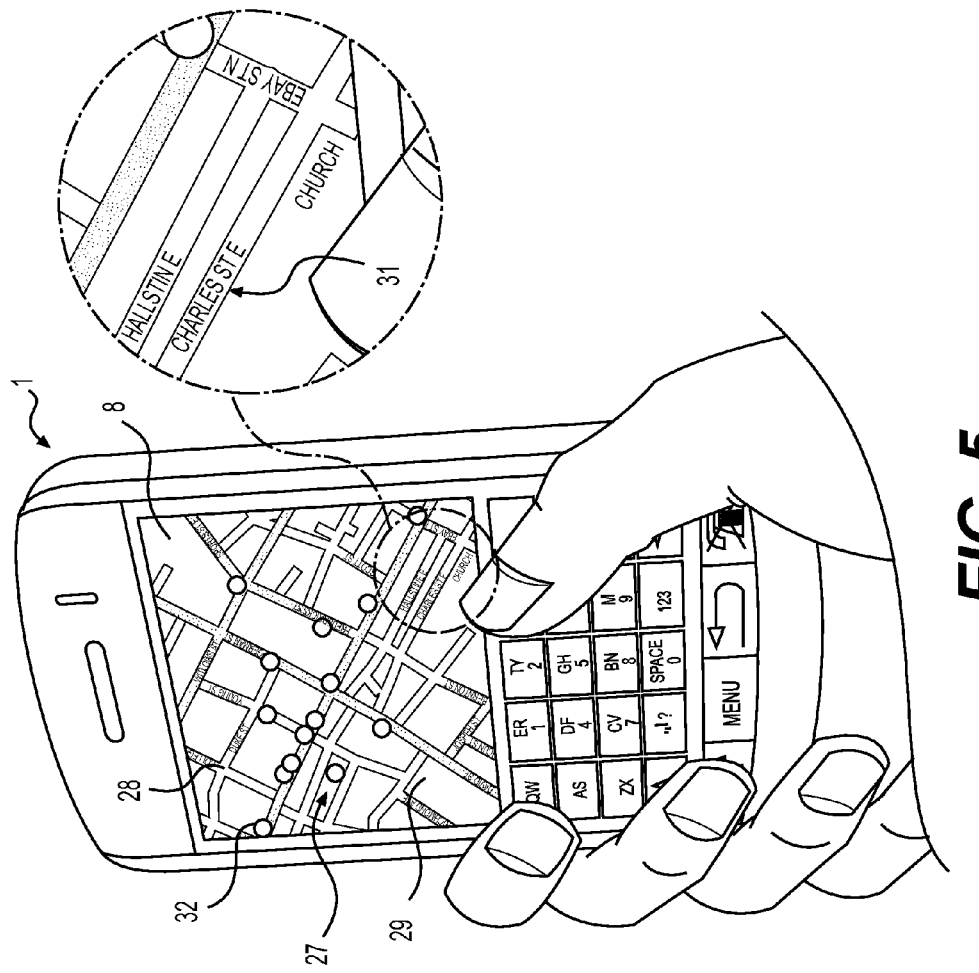
FIGS. 4 to 5 illustrate an example of adjustment of graphical data displayed on a display of a portable electronic device, consistent with disclosed embodiments.
Figure 4:
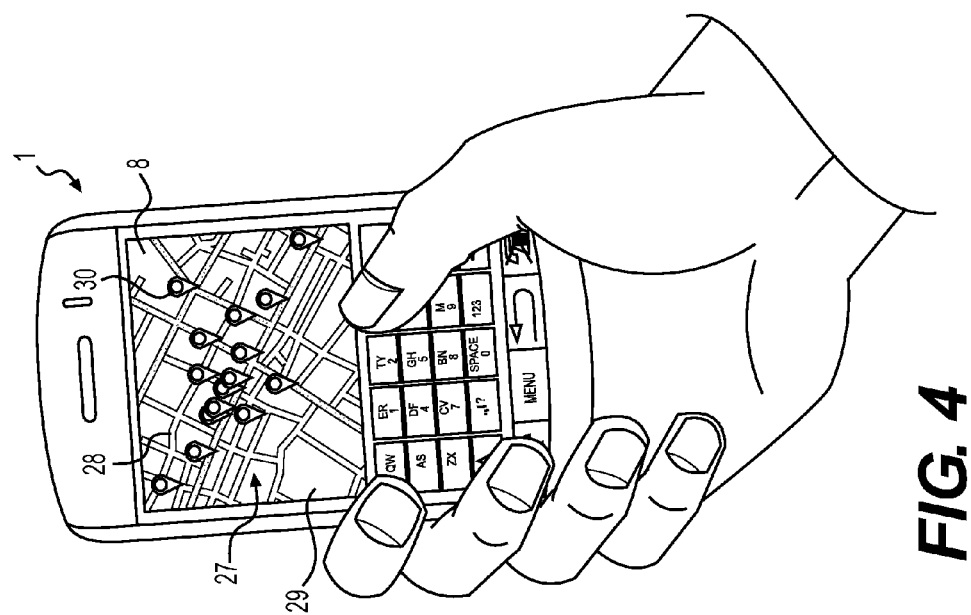

FIGS. 4-5 illustrate an example of a process for adjusting a presentation of graphical data displayed on display 8 of electronic device 1 related to map application 27. Map application 27 presents graphical data related to the geographic location of device 1 provided by location module 21. For instance, map application 27 provides images depicting streets 28 and geographic terrain 29 bordered by streets 28. Map application 27 also includes destination markers 30, which graphically indicate the geographical locations of a desired destination, such as restaurants, gas stations, and the like. FIG. 4 depicts electronic device 1 under baseline conditions. That is, electronic device 1 remains motionless and the plane of display 8 is positioned flat relative to the user. Accordingly, the graphical data of map application 27 (e.g., streets 28, geographic terrain 29, and destination markers 30), as shown in FIG. 4, represents the default graphical data under baseline conditions of electronic device 1.

FIG. 5 illustrates the electronic device 1 of FIG. 4 rotated to a leftward position relative to the user. As electronic device 1 is rotated, movement detection module 23 detects the movement, and GUI adjustment module 24 determines that the movement is within the scope of a predetermined movement. GUI adjustment module 24 then associates new graphical data to the existing, default graphical data presented on display 8. For example, GUI adjustment module 24 overlays new text 31 on top of the existing street images 28. The text 31 provides street names to the street images 28, which may have previously been presented on display 8 under the baseline conditions of electronic device 1. The text 31 is positioned directly over the existing street images 28 and provides additional graphical data pertaining to map application 27 simply through a user-controlled motion of device 1. Moreover, presenting the text 31 in a separate graphical arrangement prevents a cluttered GUI. Movement of electronic device 1 also initiates GUI adjustment module 24 to remove destination markers 30. Destination markers 30 is removed to clarify and highlight the text 31 associated with street images 28. Smaller destination pinpoints 32 replace destination markers 30 to improve GUI clarity.

The default graphical arrangement presented in FIG. 4 is regenerated by moving electronic device 1 back to the position defined by the baseline conditions, or by waiting a set amount of time in the rotated position such that the above-described "timeout" function gradually reverts display 8 back to the default graphical arrangement. As illustrated in FIGS. 4-5, the relative positions of the existing graphical data is maintained on display 8 when new graphical data is overlaid. For example, the positions of street images 28 and geographical terrain 29 are fixed as street text 31 are overlaid onto the existing street images 28. In other words, the x, y, and z coordinates of the exiting graphical data (e.g., street images 28 and geographical terrain 29) do not change when new graphical data (e.g., street text 31) is added to display 8.

Although FIGS. 4-5 illustrate electronic device 1 being rotated in a leftward direction to initiate graphical adjustment by GUI adjustment module 24, it should be appreciated that any other motion initiates GUI adjustment module 24, such as rightward rotation, shaking, and/or upward and downward tilting.

Figure 7:
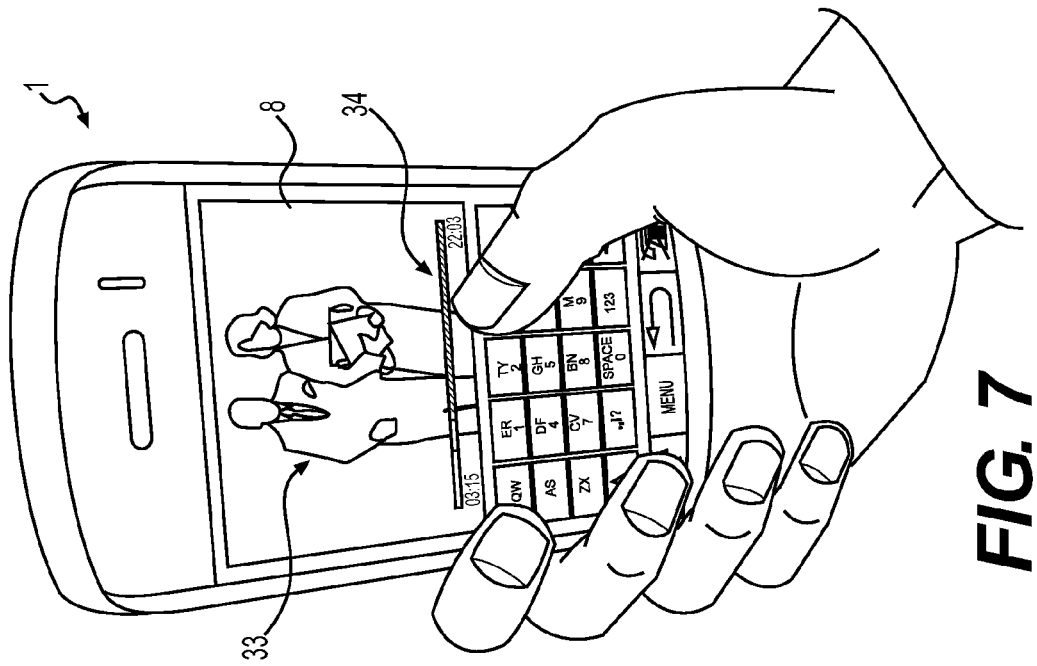
FIGS. 6 to 7 illustrate another example of adjustment of graphical data displayed on a display of a portable electronic device, consistent with disclosed embodiments.
Figure 6:
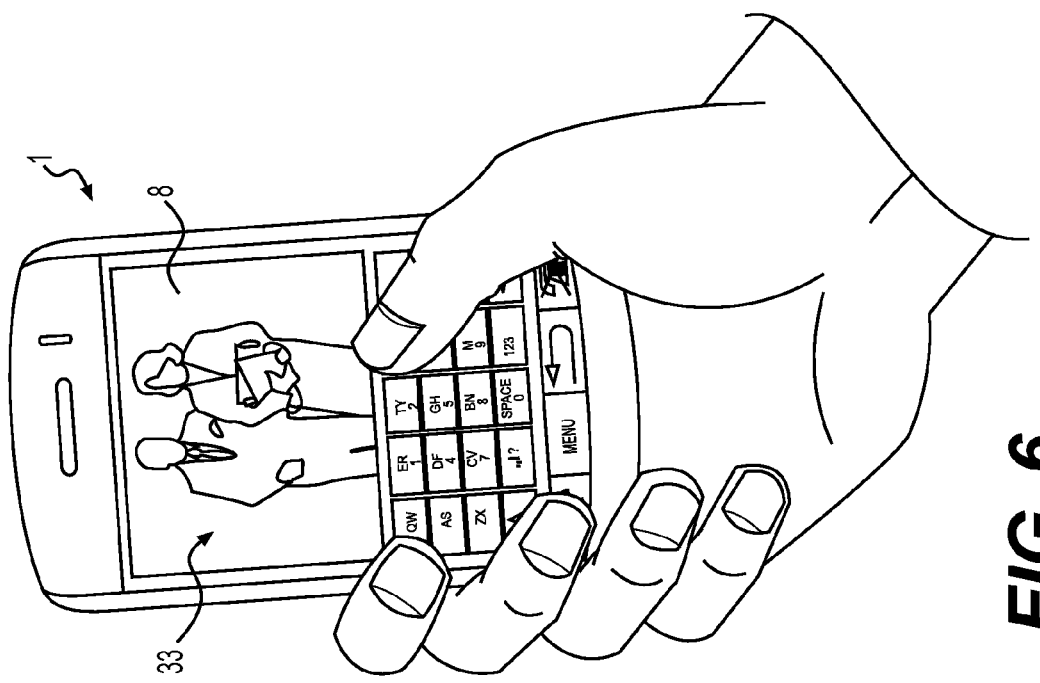

FIGS. 6-7 illustrate another example of a process for adjusting a presentation of graphical data displayed on display 8 of electronic device 1 related to a video application 33. As illustrated in FIG. 6, video application 33 presents video data to the user in any known form, such as AVI, MPEG, MP4, and the like. For example, a movie stored in RAM 7 or flash memory 14 or downloaded from wireless network 5 can be played for display on display 8. Similar to the embodiment of FIG. 4, FIG. 6 depicts electronic device 1 under baseline conditions. That is, when electronic device 1 remains motionless, the plane of display 8 is positioned flat relative to the user. As such, the graphical data of video application 33 (e.g., the scenes of the movie) represents the default graphical data.

FIG. 7 illustrates the electronic device 1 of FIG. 6 tilted towards the user to a downward position. As electronic device 1 is tilted, movement detection module 23 detects the movement, and GUI adjustment module 24 determines that the movement is within the scope of a predetermined movement. GUI adjustment module 24 then adds a playbar 34 directly on top of the scenes presented by video application 33. In other words, playbar 34 is overlaid on top of the previously existing scenes. Playbar 34 provides new graphical data to the user by indicating the progress and time elapsed of the movie being played. In some example embodiments, the playbar 34 allows for control of video playback, such as pausing, fast forwarding, reverse play, etc. As before, the default graphical arrangement presented in FIG. 6 (i.e., the video without playbar 34) can be regenerated by moving electronic device 1 back to the position defined by the baseline conditions, or by waiting a set amount of time in the tilted position.

It should be appreciated that any other motion may initiate GUI adjustment module 24 to adjust the presentation of graphical data related to video application 33 displayed on display 8.

Figure 10:
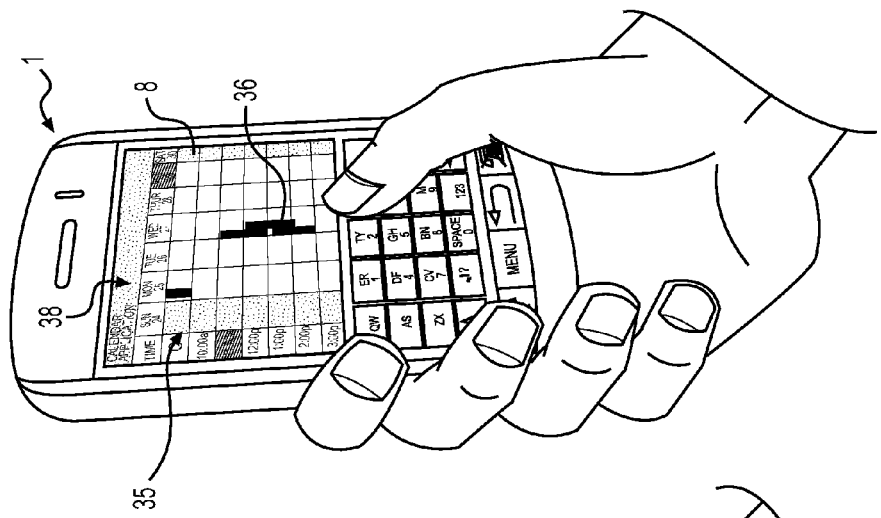
FIGS. 8 to 10 illustrate another example of adjustment of graphical data displayed on a display of a portable electronic device, consistent with disclosed embodiments.
Figure 9:
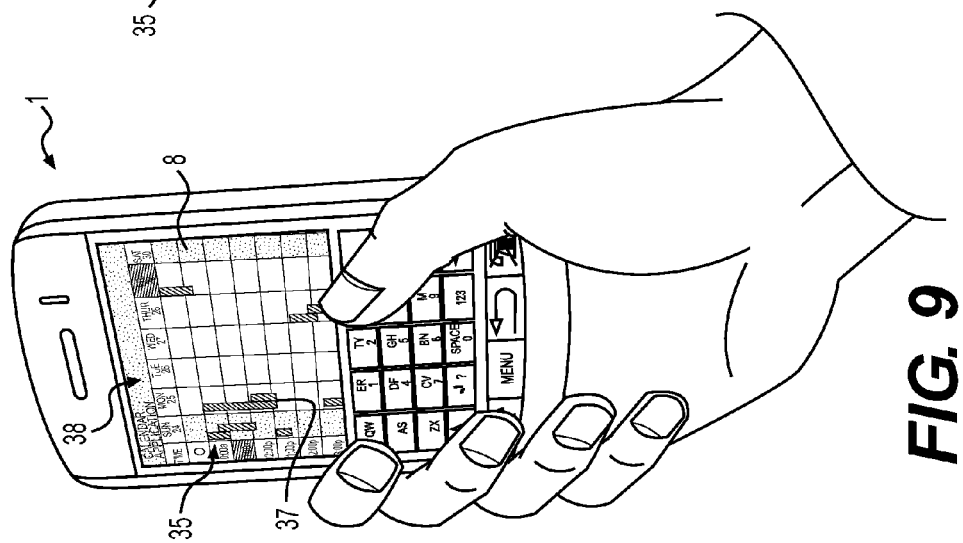
Figure 8:
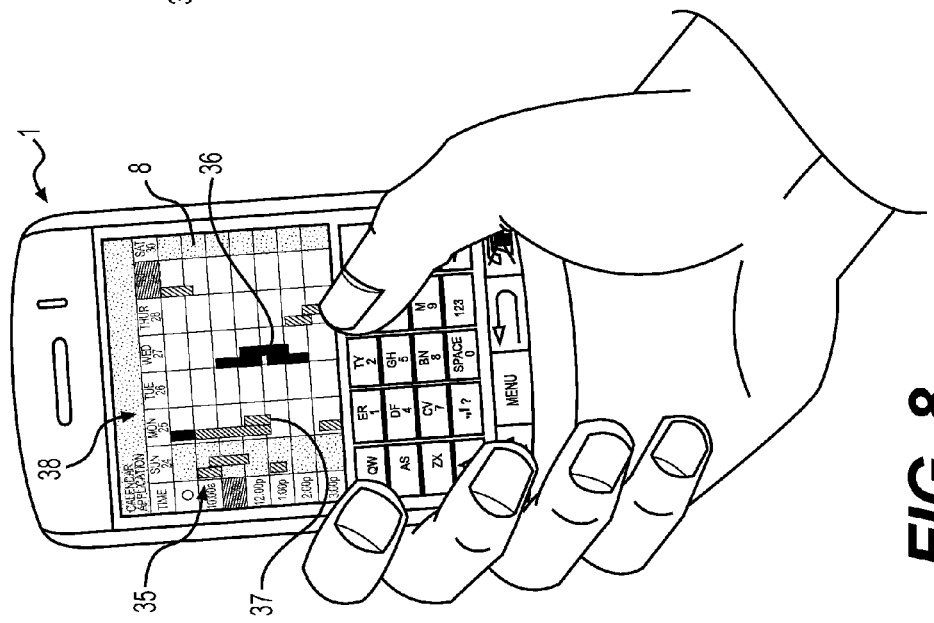

FIGS. 8-10 illustrate another example of a process for adjusting a presentation of graphical data displayed on display 8 of electronic device 1 related to a calendar application 35. Calendar application 35 graphically tracks appointments and other status matters relating to a user and device 1. Calendar application 35 provides a daily, weekly, and/or monthly electronic schedule of appointments, meetings, and events. In the example embodiments of FIGS. 8-10, calendar application 35 organizes and displays graphical data relating to particular events, for example, social events 36 (solid bars) and work-related events 37 (cross-hatched bars), on a schedule 38. FIG. 8 depicts electronic device 1 under baseline conditions. That is, electronic device 1 remains motionless and the plane of display 8 is positioned flat relative to the user. Accordingly, the graphical data of calendar application 35 (e.g., schedule 38, social events 36, and work-related events 37) represents the default graphical data under the baseline conditions of electronic device 1.

FIG. 9 illustrates the electronic device 1 of FIG. 8 rotated to a leftward position relative to the user. As electronic device 1 is rotated, movement detection module 23 detects the movement, and GUI adjustment module 24 determines that the movement is within the scope of a predetermined movement. GUI adjustment module 24 then removes at least some of the existing graphical data presented on display 8. In one embodiment, for example, GUI adjustment module 24 removes the social events 36 images, thereby leaving only the work-related events 37 images on schedule 38. Similarly, rotating electronic device 1 to a rightward position relative to the user removes the work-related events 37 images, and may leave only the social events 36 images displayed on schedule 38, as shown in FIG. 10. Removing certain existing graphical data by merely moving electronic device 1 simplifies the manner in which graphical data is organized and presented to the user. For instance, the user highlights and/or determines what social events 36 to be scheduled by a mere rightward rotation of device 1.

Similar to the embodiments above, the existing graphical data (e.g., schedule 38, social events 36, and work-related events 37) maintains their relative positions when certain graphical data is removed from display 8. Moreover, the default graphical arrangement presented in FIG. 8 is regenerated by moving device 1 back to the baseline position or by waiting for the "timeout" function to initiate. It should be appreciated that any other motion may initiate GUI adjustment module 24 to adjust the presentation of graphical data related to calendar application 35 displayed on display 8.

Figure 13:
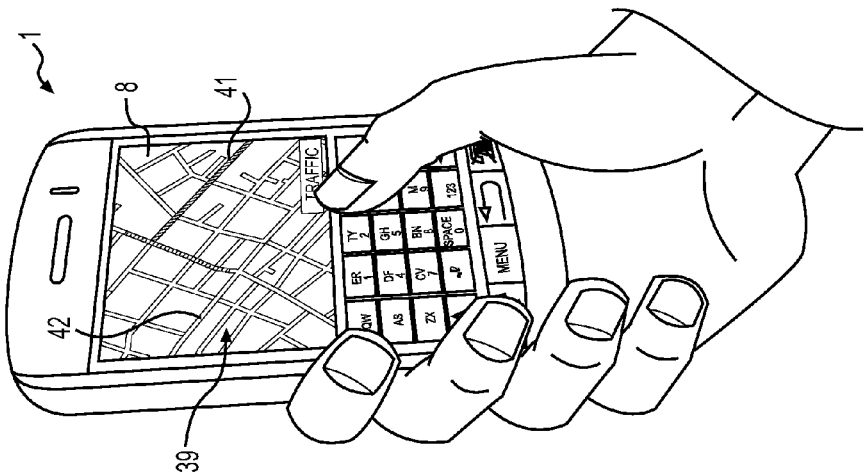
FIGS. 11 to 13 illustrate another example adjustment of graphical data displayed on a display of a portable electronic device, consistent with disclosed embodiments.
Figure 12:
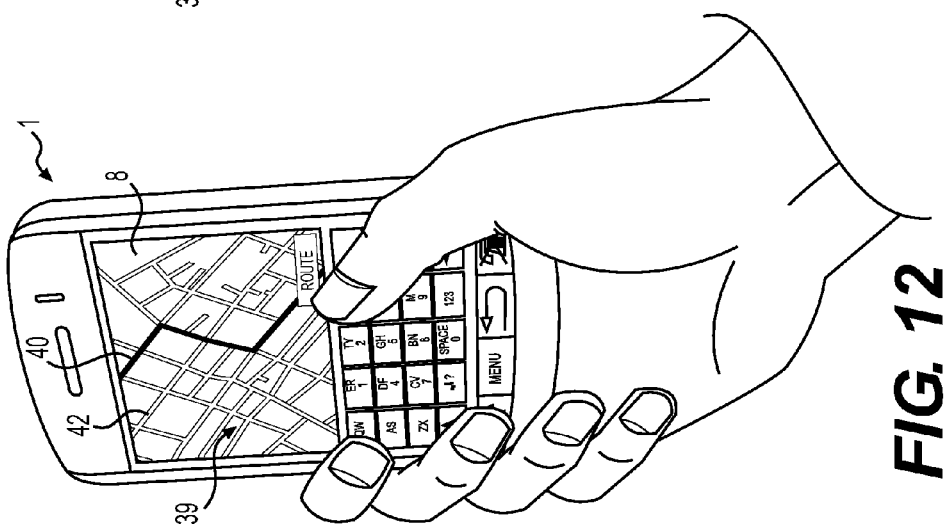
Figure 11:
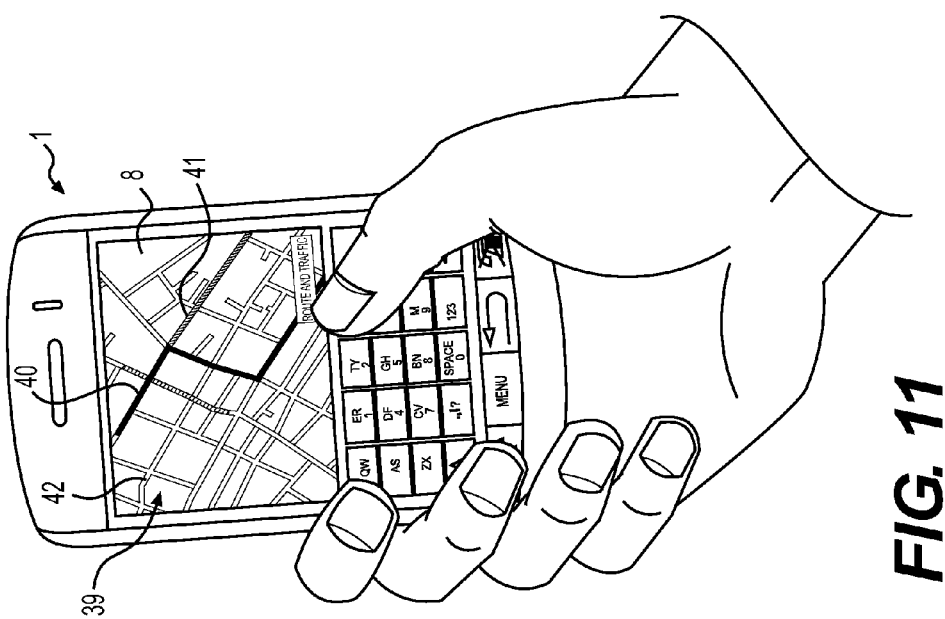

FIGS. 11-13 illustrate another example of a process for adjusting a presentation of graphical data displayed on display 8 of electronic device 1 related to another map application 39. FIG. 11 depicts electronic device 1 under baseline conditions. Map application 39 displays a highlighted navigation route 40 (solid lines) and highlighted traffic data 41 (i.e., the degree of congestion on a certain street, depicted as cross-hatched lines) associated with street images 42. When electronic device 1 is rotated to a leftward position relative to the user, GUI adjustment module 24 removes highlighted traffic data 41 from display 8 and leaves street images 42 and highlighted navigation route 40, as shown in FIG. 12. Furthermore, and as shown in FIG. 13, when electronic device 1 is rotated to a rightward position relative to the user, GUI adjustment module 24 removes highlighted navigation route 40 from display 8 and leaves street images 42 and highlighted traffic data 41.

Similar to the example embodiments above, the existing graphical data (e.g., highlighted navigation route 40, highlighted traffic data 41, and street images 42) maintains their relative positions when certain graphical data is removed from display 8. Moreover, the default graphical arrangement presented in FIG. 11 is regenerated by moving device 1 back to the baseline position or by waiting for the "timeout" function to initiate. It should also be appreciated that any other motion may initiate GUI adjustment module 24 to adjust the presentation of graphical data related to map application 39 displayed on display 8.

FIGS. 14-16 illustrate another example of adjusting a presentation of graphical data displayed on display 8 of electronic device 1 related to a calendar application 350. Calendar application 350 graphically tracks appointments and other status matters relating to a user and device 1. Calendar application 350 provides a daily, weekly, and/or monthly electronic schedule of appointments, meetings, and events. In the example embodiments of FIGS. 14-16, calendar application 350 organizes and displays graphical data relating to, for example, the number of events or the duration of one or more events, scheduled on a particular day. In other words, an event bar 370 indicates to a user the number of events or the duration of one or more events scheduled on a particular day relative to the other days based on the relative length of event bar 370. FIG. 14 depicts electronic device 1 under baseline conditions. That is, electronic device 1 remains motionless and the plane of display 8 is positioned flat relative to the user. Accordingly, the graphical data of calendar application 350 (e.g., the windows representing the days of a month and event bars 370) represents the default graphical data under the baseline conditions of electronic device 1.

FIG. 15 illustrates the electronic device 1 of FIG. 14 rotated to a leftward position relative to the user. As electronic device 1 is rotated, movement detection module 23 detects the movement, and GUI adjustment module 24 determines that the movement is within the scope of a predetermined movement. GUI adjustment module 24 then overlays a three-dimensional block 380 over the windows of days that have scheduled events. Each three-dimensional block 380 corresponds to a particular event bar 370. In other words, a height of each three-dimensional block 380 indicates to the user the number of events or the duration of one or more events scheduled on a particular day relative to the other days. The three-dimensional blocks 380 therefore provide an additional view of the events scheduled in calendar application 350. Similarly, and as shown in FIG. 16, rotating electronic device 1 to a rightward position relative to the user overlays three-dimensional blocks 380 over the windows of days and provides a perspective view of the left side of each block 380. Moreover, the default graphical arrangement presented in FIG. 14 is regenerated by moving device 1 back to the baseline position or by waiting for the "timeout" function to initiate. It should be appreciated that any other motion may initiate GUI adjustment module 24 to adjust the presentation of graphical data related to calendar application 350 displayed on display 8.

Furthermore, it should appreciated that the user may control the angle of rotation that initiates GUI adjustment module 24 to adjust the presentation of graphical data. In other words, the user may change the degree of leftward or rightward rotation of the electronic device 1 that initiates GUI adjustment module 24. The user may input the desired rotation angle as a setting of the electronic device 1.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

Other embodiments will be apparent to those skilled in the art from consideration of the specification and practice of the concepts disclosed herein. It is intended that the specification and examples be considered as example only, with a true scope and spirit of the concepts disclosed herein being indicated by the following claims.

What is claimed is:

1. A graphics system for managing an initial graphical arrangement displayed on a graphical user interface (GUI) of an electronic device, wherein the initial graphical arrangement includes first graphical data and second graphical data, the system comprising:
 a movement detector to detect movement of the electronic device; and
 a processor and memory to:
  receive movement data from the movement detector;
  remove the first graphical data displayed on the GUI based on a first predetermined movement of the electronic device;
  fix the position of the second graphical data relative to the GUI when removing the first graphical data;
  remove the second graphical data displayed on the GUI in response to a second predetermined movement of the electronic device; and
  fix the position of the first graphical data relative to the GUI when removing the second graphical data.

2. The graphics system of claim 1, wherein the processor is configured to position new graphical data directly on top of the initial graphical arrangement displayed on the GUI in response to either the first predetermined movement or the second predetermined movement of the electronic device.

3. The graphics system of claim 2, wherein the new graphical data is not displayed on the GUI prior to either the first predetermined movement or the second predetermined movement of the electronic device.

4. The graphics system of claim 1, wherein the processor is configured to overlay new graphical data to the initial graphical arrangement in response to either the first predetermined movement or the second predetermined movement of the electronic device and maintain a position of the initial graphical arrangement relative to the GUI when overlaying the new graphical data.

5. The graphics system of claim 1, wherein the processor is configured to set a default arrangement on the GUI when a predetermined time has passed after either the first predetermined movement or the second predetermined movement of the electronic device.

6. The graphics system of claim 1, wherein the movement detector includes a sensor configured to generate a signal responsive to a change in orientation of the electronic device.

7. The graphics system of claim 2, wherein the new graphical data alters an appearance of the initial graphical arrangement in response to either the first predetermined movement or the second predetermined movement of the electronic device.

8. The graphics system of claim 4, wherein the position of the initial graphical arrangement is fixed relative to the GUI when the new graphical data is overlaid to the initial graphical arrangement.

9. A method for adjusting presentation of an initial graphical arrangement displayed on a graphical user interface (GUI) of an electronic device, wherein the initial graphical arrangement includes first graphical data and second graphical data, the method comprising:
 monitoring movement of the electronic device;
 removing the first graphical data displayed on the GUI in response to a first predetermined movement of the electronic device;
 fixing the position of the second graphical data relative to the GUI when removing the first graphical data;
 removing the second graphical data displayed on the GUI in response to a second predetermined movement of the electronic device;

fixing the position of the first graphical data relative to the GUI when removing the second graphical data; and overlaying new graphical data to the initial graphical arrangement displayed on the GUI in response to either the first predetermined movement or the second predetermined movement.

10. The method of claim 9, further comprising fixing a position of the initial graphical arrangement relative to the GUI when overlaying the new graphical data.

11. The method of claim 10, further comprising positioning the new graphical data directly on top of the initial graphical arrangement displayed on the GUI in response to either the first predetermined movement or the second predetermined movement.

12. The method of claim 9, further comprising setting a default arrangement on the GUI when a predetermined time has passed after either the first predetermined movement or the second predetermined movement has been identified.

13. A method for adjusting presentation of default graphical data displayed on a graphical user interface (GUI) of an electronic device, wherein the default graphical data includes first graphical data and second graphical data, the method comprising:

monitoring movement of the electronic device from an initial position;

removing the first graphical data displayed on the GUI in response to a first predetermined movement of the electronic device;

fixing the position of the second graphical data relative to the GUI when removing the first graphical data;

removing the second graphical data displayed on the GUI in response to a second predetermined movement of the electronic device; and fixing the position of the first graphical data relative to the GUI when removing the second graphical data.

14. The method of claim 13, further comprising positioning new graphical data directly on top of the default graphical data.

15. The method of claim 13, further comprising overlaying new graphical data to the default graphical data displayed on the GUI in response to either the first predetermined movement or the second predetermined movement.

16. The method of claim 15, further comprising fixing a position of the default graphical data relative to the GUI when overlaying the new graphical data.

17. The method of claim 13, wherein the default graphical data includes an initial graphical arrangement of a user-selected application associated with the electronic device, wherein the initial graphical arrangement includes the first graphical data and the second graphical data.

18. The method of claim 17, further comprising reverting to the initial arrangement of the default graphical data when the electronic device is returned to an initial position.

19. The method of claim 18, wherein the initial arrangement includes an arrangement of the default graphical data prior to removing either the first graphical data or the second graphical data.

20. The method of claim 13, further comprising setting a default arrangement on the GUI when a predetermined time has passed after either the first predetermined movement or the second predetermined movement has been identified.

* * * * *